Patented Sept. 24, 1946

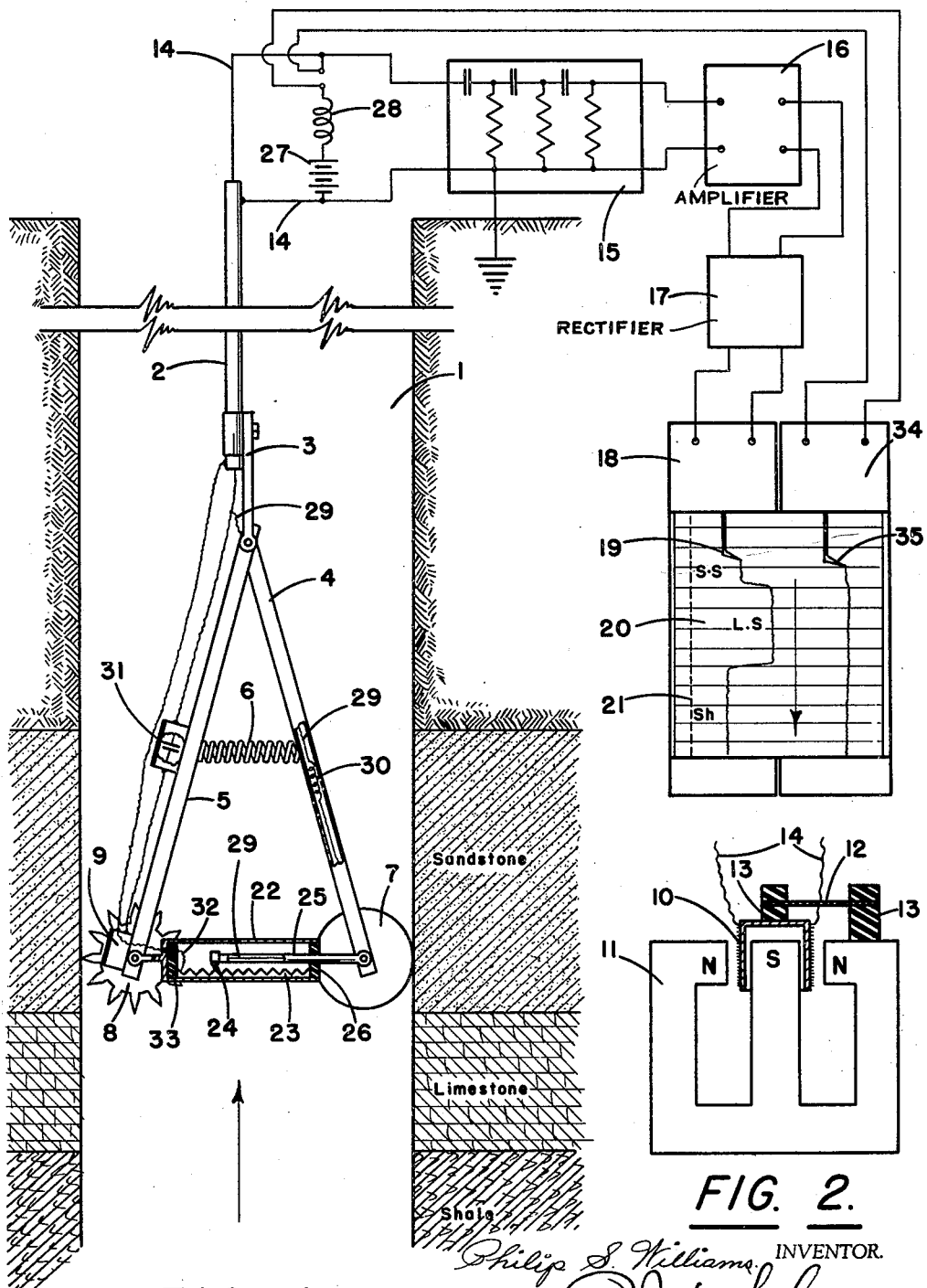

2,408,012

UNITED STATES PATENT OFFICE 2,408,012

WELL LOGGING

Philip S. Williams, Tulsa, Okla., assignor to Standard Oil Development Company, a corporation of Delaware Application August 10, 1942, Serial No. 454,242

8 Claims. (Cl. 73—152)

The present invention is directed to a method and apparatus for logging the formations traversed by a bore hole.

The principal object of the present invention is the provision of a method and apparatus which may be utilized to secure data from which the nature of formations traversed by a bore hole may be further understood.

More specifically, it is an object of the present invention to provide a method and apparatus for the employment of which response of the formations traversed by a bore hole to sharp impacts is recorded. These sharp impacts are to be distinguished from a scraping action, it being the purpose of the present invention to submit the formations to a sharp penetrating impact, the degree of penetration being a function of the degree of hardness in the formation, and the degree of response of the recording apparatus to the impacts being directly related to the degree of hardness of the formations.

The present invention will be better understood from the following detailed description of the accompanying drawing, in which Fig. 1 is a front elevation in diagrammatic form and partly in section of one embodiment of the present invention in operative position, and Fig. 2 is a detail view of an impact responsive element.

Referring to the drawing in detail, numeral 1 designates a bore hole traversing various formations. Suspended in the bore hole is an armored cable, 2, carrying at its lower end a bracket, 3, to which are pivoted a pair of arms, 4 and 5, which are held in spaced relation by a spring, 6. The arm 4 carries at its lower end a rotatable wheel, 7, while arm 5 carries at its lower end a spiked wheel, 8, the spikes being so disposed as to deliver successive distinct impacts to the wall of the bore hole as the assembly is moved along the bore hole. Mounted on the lower end of arm 5 is a microphone, 9, consisting essentially of a coil, 10, suspended for vibration in the field of a magnet, 11, the coil being suspended from one pole of the magnet by a spring, 12, there being insulated blocks, 13, between the spring and the magnet and coil, respectively. The terminals, 14, of the coil are connected through the cable to the recording equipment at the surface, one of the terminals being carried in the center of the armored cable and the other terminal connected to the armor of the cable. It will be understood that in accordance with conventional practice the cable is wound on a drum at the surface and is passed over a sheave at the mouth of the bore hole, the sheave being operatively associated with the recording apparatus in such a way as to operate a recording chart so as to correlate the values recorded on the chart with depth. The conductors associated with the coil mounted on the drum are connected to the recording apparatus by a slip ring apparatus. The recording apparatus includes a high-pass filter, 15, which is so designed as to pass frequencies above about 1,000 cycles per second and so as to exclude the frequencies generated by the microphone as a result of the large movement of the arms, 4 and 5, by reason of variations in diameter of the hole, and the "walking" motion of the toothed wheel, both as distinguished from the high frequency vibrations caused by the impacts of the spikes against the formations. The output of this filter is delivered to a high-gain amplifier, 16, which in turn is so designed as to retain its sensitivity to high frequencies of the order of 10,000 to 15,000 cycles per second. The output of the amplifier passes through a full-wave rectifier, 17, to produce a pulsating direct current which is transmitted to a recorder, 18, of the moving-pen type, having a pen, 19, which moves in response to variations in voltages delivered to the rectifier, 17, and a record tape, 20, which moves in synchronism with the travel of the assembly in the bore hole as heretofore described.

As illustrated, the assembly can be moved up or down the bore hole and a record made for each direction of movement. If desired, the arms can be provided with a catch which holds them together and is released only when the assembly strikes the bottom of the bore, whereby the record is made only when the assembly is pulled upwardly in the bore hole. The recorder traces the amplitude of the high frequency components of the motion normal to the bore hole wall and the axle of the spiked wheel as the assembly is drawn up the hole. In the drawing is shown the type of record obtainable when the assembly passes in succession through soft shale, hard limestone, and medium hard sandstone. The zero line on the record is indicated by numeral 21.

The basic principle of operation of this invention should now be evident. When the toothed wheel is rolled over extremely hard material, for example, there is no "give" of the formation where the points strike, and consequently the impacts are very hard and sharp. If the formation is soft, on the other hand, the material gives way immediately under the point, thus cushioning the impact. The degree of sharpness of the impact is reflected by the amount of electrical energy in the high frequency ranges delivered by the microphone. Since the filter in the device is calculated to pass selectively only the high frequency, the amplitude of the signal delivered to the rectifier, 17, is a more or less direct measure of the hardness of the formations over which the toothed wheel rolls. It may be noted that the high frequency filter is highly desirable, since the low frequency "walking" motion of the wheel is of sufficient amplitude to mask to some extent the variations in high frequency output which are sought.

It is advantageous to record simultaneously with the hardness index a chart showing the variation in diameter with depth of the bore hole. This may conveniently be done with the apparatus because the essential features required for the hardness determination include substantially all those required for measuring variations in bore hole diameter. To make the latter measurement there is pivoted to the lower end of arm 5 a cylinder, 22, in which is mounted a resistor, 23, on which slides a pointer, 24, carried by a hollow rod, 25, which is pivoted at the lower end of arm 4 and which runs through a fluid-tight packing, 26. Connected across conductors, 14, at the surface are a battery, 27, arranged in series with a choke, 22. A branch line, 29, is connected to the central conductor, 14, and passes through arm 4 which is made hollow for this purpose. This conductor, 29, includes a choke coil, 30, the purpose of which is to prevent high frequency current from passing to the resistor, 23. Between the point of connection of the branch line, 29, with the conductor, 14, and the microphone is a condenser, 31, which may be conveniently mounted on arm 5. This condenser prevents the current from the battery from passing to the microphone. It may be observed that one end of the resistor, 23, is connected by a conductor, 32, to the ground terminal of the microphone. This conductor is an insulated conductor which passes through a packing disc, 33, at the end of the cylinder, 22. It will be noted that the rod, 25, is a hollow nonconductor and that the insulated conductor, 29, passes through this hollow rod to the metallic pointer, 24. These arrangements are provided to prevent bore hole fluid from entering into the cylinder, 22, and affecting the resistance measurements.

A second pen-type recorder, 34, is arranged alongside recorder, 18, in such a manner that its pen, 35, operates on the same record strip, 20. In this way two traces are made on the record strip—the one varying with bore hole diameter and the other varying with the hardness of the formation traversed.

It is to be understood that the embodiment illustrated in the drawing and described above represents only one form which the present invention may take. Many variations in this embodiment are possible without departing from the scope of the invention. The nature and objects of the present invention having been thus described and illustrated, what is claimed as new and useful and is desired to be secured by Letters Patent is:

1. A method of logging formations traversed by a bore hole, which comprises delivering sharp hammer-like blows directly against said formations along the wall of said bore hole, generating in the bore hole electrical impulses which are a function of the resistance of said formations to said blows, transmitting said electrical impulses to the surface, segregating high frequency components of said impulses, and recording them as a function of the resistance of said formations to said blows.

2. An apparatus for logging formations traversed by a bore hole, comprising a device adapted to be passed along said bore hole, means physically attached to said device for delivering sharp hammer-like blows directly against the wall of the bore hole as it moves along said bore hole whereby mechanical vibrations are generated in said device in response to the resistance of said wall to said blows, and means for transmitting to the surface values indicative of the variations of said device.

3. An apparatus for logging formations traversed by a bore hole, comprising a device adapted to be passed along said bore hole, means physically attached to said device for delivering sharp hammer-like blows directly against the formations as said device moves along said bore hole whereby mechanical vibrations are generated in said device in response to the resistance of the formation to said blows, means carried by said device for converting the mechanical vibrations of said device resulting from said blows into electrical impulses, means for transmitting said impulses to the surface, and means for recording at the surface a value derived from said impulses.

4. An apparatus according to claim 3 in which the recording means at the surface includes means for filtering out from said impulses high frequency components thereof, means for amplifying said high frequency impulses, and means for recording said impulses.

5. An apparatus for logging a borehole for hardness of the formations traversed by the borehole comprising contacting means having movable elements adapted to follow the contour of the walls of said borehole, means for moving said contacting means along the borehole, means carried by one of said movable elements for delivering successive physical impacts to the wall of the borehole as said element moves along said wall whereby vibrations are set up in said element of a nature dependent upon the resistance of said wall to said impacts and means at the surface for indicating the nature of the vibrations set up in said movable element.

6. An apparatus for logging a borehole for variations in diameter and hardness of the formations traversed by the borehole comprising contacting means having movable elements adapted to follow the contour of the walls of said borehole, means for moving said contacting means along the borehole, means carried by one of said movable elements for delivering successive physical impacts to the wall of the borehole as said element moves along said wall, whereby vibrations are set up in said element of a nature dependent upon the resistance of said wall to said impacts, means carried by said element for converting mechanical vibrations thereof into electrical values, and means at the surface for indicating the electrical response of said converting means to said vibrations.

7. An apparatus for logging a borehole for hardness of formations traversed, comprising a pair of pivoted arms adapted to be lowered into the borehole, means for holding the free ends of said arms in contact with the wall of the borehole, means carried by the free ends of one of said arms for delivering successive physical impacts against the wall of the borehole as said arm moves along said wall whereby mechanical vibrations are set up in said arm of a character dependent upon the resistance of said borehole wall to said impacts, means for moving said arms along said borehole and means for indicating the nature of the vibrations imparted to said arm carrying said impacting device by the reaction of said borehole wall on said impacting device.

8. An apparatus for logging a borehole for hardness of formations traversed comprising a pair of pivoted arms adapted to be passed along said borehole, means for forcing the free ends of said arms into engagement with said borehole, means carried by the free end of one of said arms for delivering successive physical impacts to the wall of the borehole as said arm passes therealong whereby mechanical vibrations are set up in said arm of a nature dependent upon the resistance of said wall to said impacts, means for moving said arms along said borehole, means mounted on the arm carrying the impacting device for converting mechanical vibrations of said arm into electrical value and means at the surface for indicating the electrical response of said converting means to said vibrations.

PHILIP S. WILLIAMS.